C. L. TAYLOR.
MACHINE BRAKE.
APPLICATION FILED FEB. 21, 1908.
987,927
Patented Mar. 28, 1911.
3 SHEETS—SHEET 1.
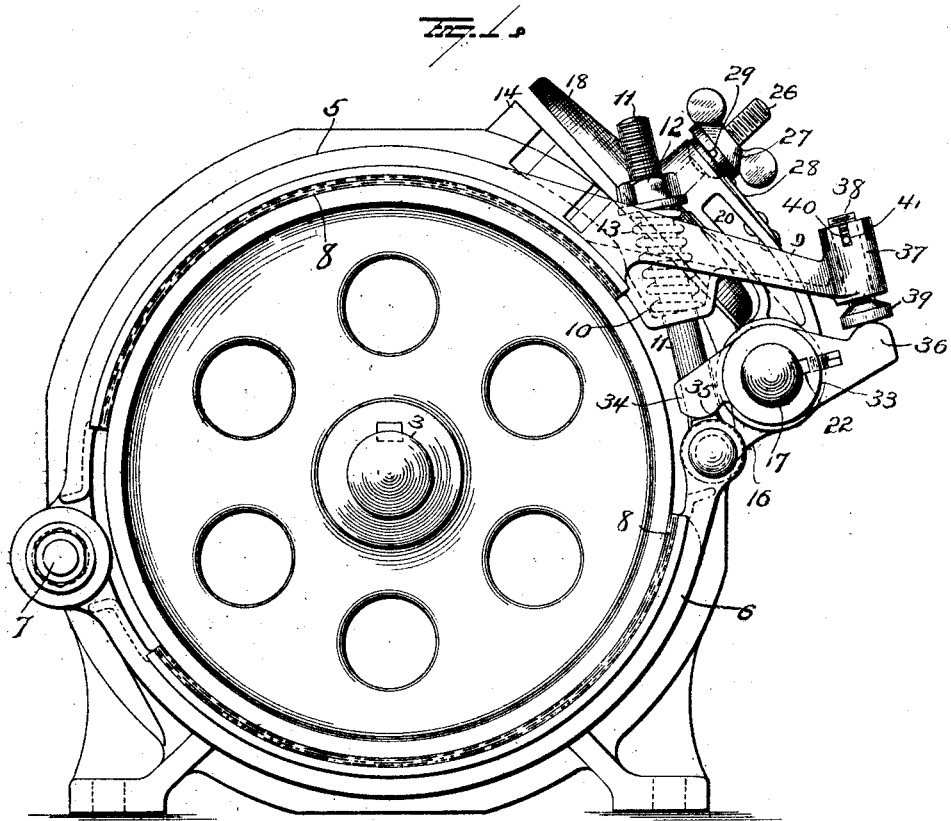
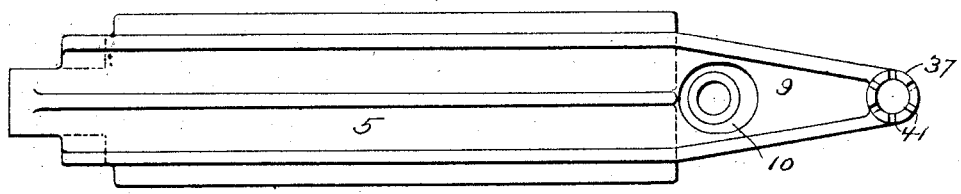
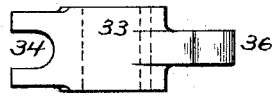
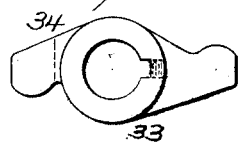
WITNESSES
E. J. Nottingham
G. F. Downing.
INVENTOR
C. L. Taylor
By H. A. Seymour
Attorney

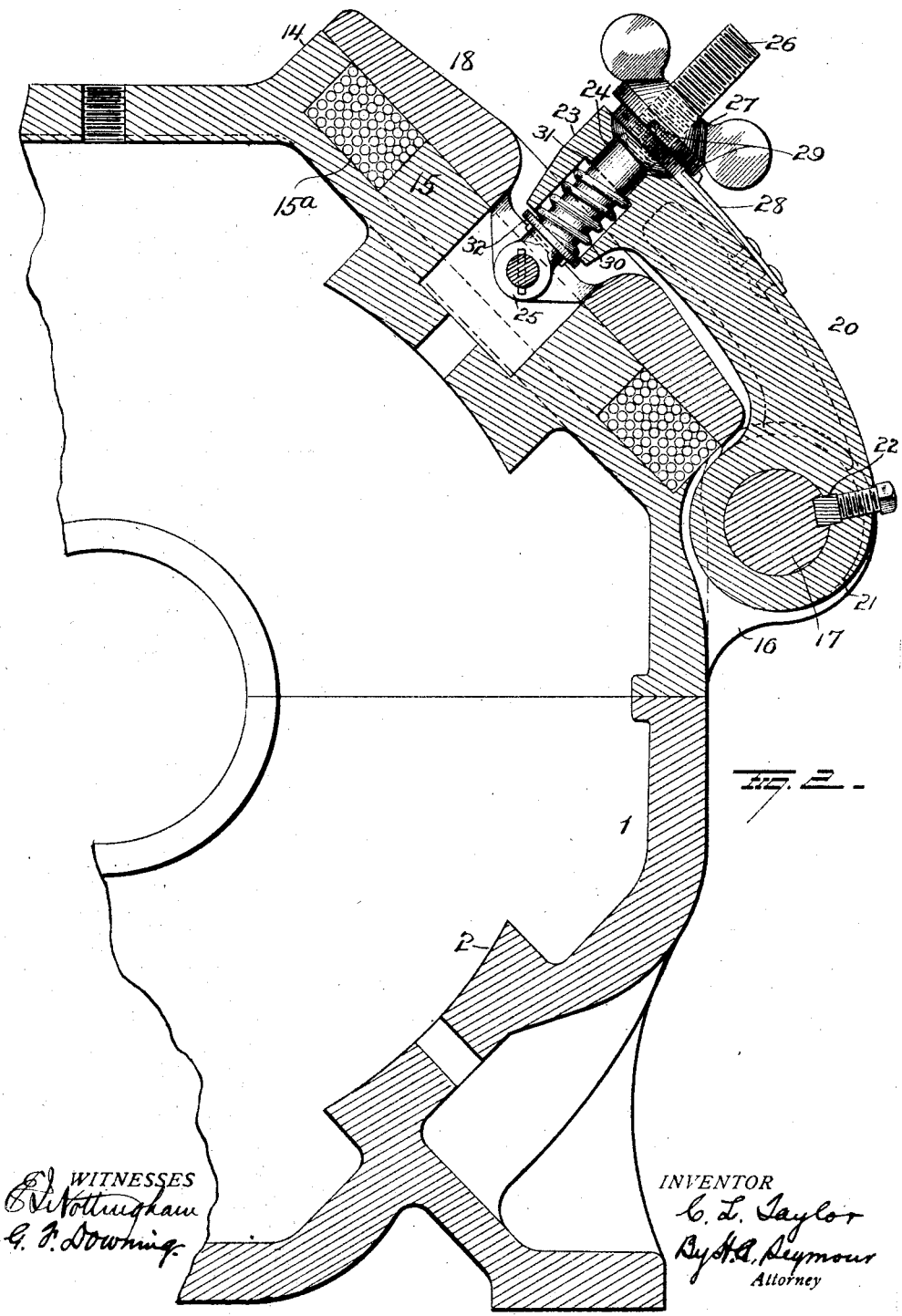

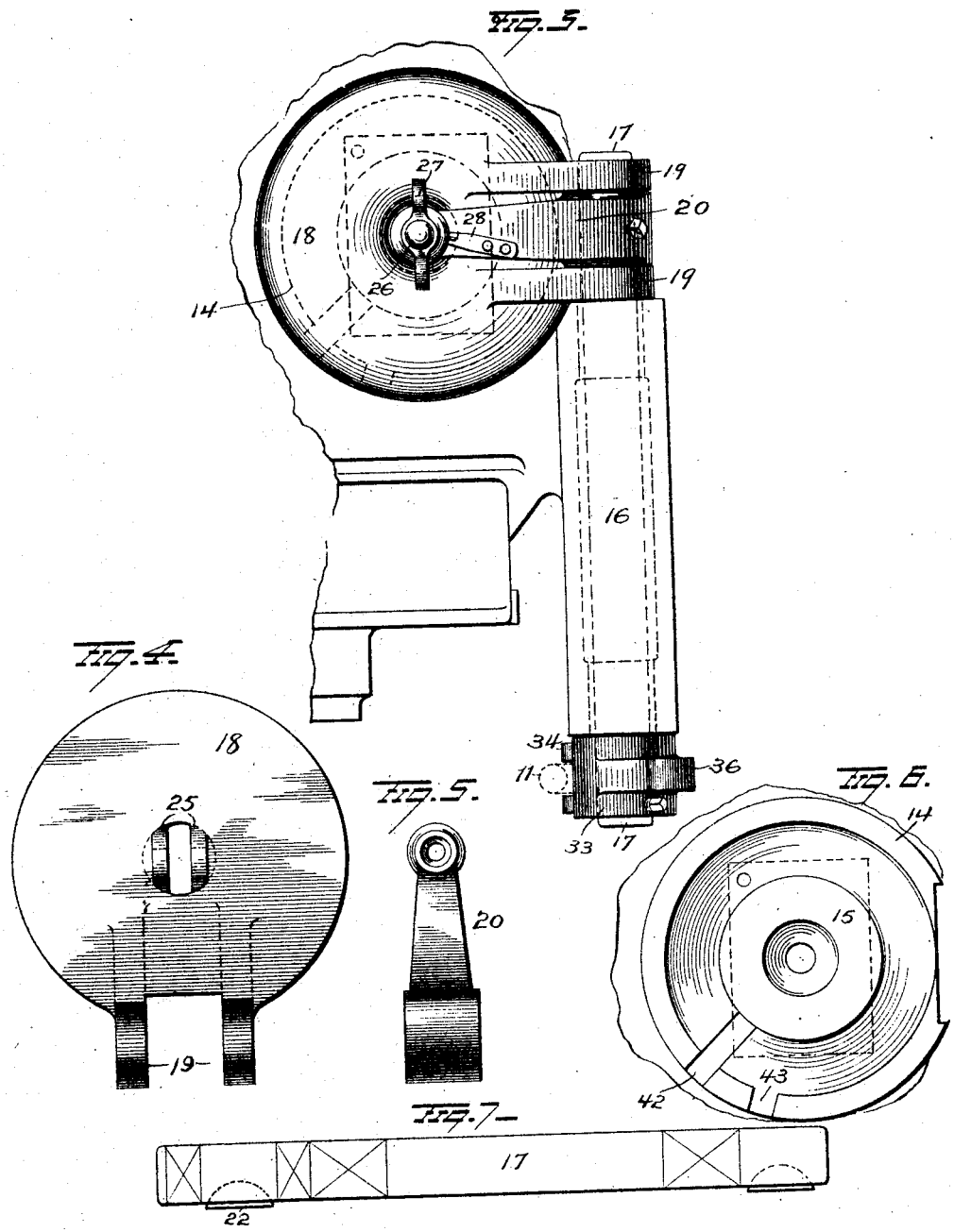

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

MACHINE-BRAKE.

987,927.

Specification of Letters Patent. Patented Mar. 28, 1911.

Application filed February 21, 1908. Serial No. 417,176.

*To all whom it may concern:*

Be it known that I, CLARENCE L. TAYLOR, of Alliance, in the county of Stark and State of Ohio, have invented certain new and useful Improvements in Machine-Brakes; and I do hereby declare the following to be a full, clear, and exact description of the invention, such as will enable others skilled in the art to which it appertains to make and use the same.

This invention relates to improvements in machine brakes, and more particularly to such as are closely associated with an electric motor and adapted to control the operation of brake shoes which coöperate with a brake wheel on the armature shaft,—the object of the invention being to provide a structure of the character above mentioned, which shall be of compact construction, comprise comparatively few parts, and which shall operate automatically to effectually apply the brake shoe to the brake wheel or insure the ready release of said brake shoes from the brake wheel.

With this object in view the invention consists in certain novel features of construction and combinations of parts as hereinafter set forth and pointed out in the claims.

In the accompanying drawings, Figure 1 is a side elevation showing the application of my improvements. Fig. 2 is an enlarged, fragmentary sectional view. Fig. 3 is a detail view showing the armature of the brake mechanism and its connection with the shaft which it actuates to operate the brake shoes. Fig. 4 is a detail face view of said armature. Fig. 5 is a view of the arm which assists in connecting the armature adjustably with the shaft. Fig. 6 is a face view of that portion of the motor frame which forms the brake magnet. Fig. 7 is a view of the shaft with which the armature is connected,—the various bearings for the parts connected with said shaft being shown diagrammatically. Fig. 7ª is a plan view of one of the brake shoe levers, and Figs. 8 and 9 are detail views of the cam-lever.

1 represents the frame of an electric motor of the "iron-clad" type, having field magnet poles 2. This casing is provided at its ends with suitable openings for the accommodation of armature bearings (not shown) and to the armature shaft 3 a brake wheel 4 is secured. Two brake levers 5, 6, are pivotally supported at 7 to the motor frame and carry brake shoes 8 to engage the periphery of the brake wheel 4. The shoe lever 5 is provided at one end with an arm 9 having a pocketed enlargement 10. A rod 11 is pivotally attached to the free end of the shoe lever 6 and passes through a hole in the bottom of the pocketed enlargement 10 and also upwardly beyond said pocketed enlargement,—the upper end of said rod being threaded for the reception of a nut 12. Between this nut and the bottom of the pocketed enlargement, a spring 13 encircles the rod 11. This spring serves to apply the shoes to the brake wheel and its tension can be readily adjusted by means of the nut 12.

The motor frame or casing 1 is provided exteriorly with two circular enlargements 14, 15, the inner one of which constitutes the core of an electro-magnet and the space between said circular enlargements serves to receive the winding 15ª of this magnet. Adjacent to the magnet thus formed, the motor casing is provided with bearings 16 for the accommodation of a shaft 17. The armature for the magnet consists of a circular disk or plate 18 having two perforated lugs 19 mounted upon the shaft 17. An arm 20 is provided at one end with a perforated enlargement which constitutes a bearing 21 on the shaft 17 at a point between the lugs or arms 19 of the armature 18. The arm 20 is keyed to the shaft 17 as shown at 22 and this arm projects over the armature 18, terminating in line with the center of the latter. At its free end the arm 20 is made with a pocketed enlargement 23 through which a bolt 24 passes. The lower end of this bolt is pivotally attached to lugs 25 at the center of the armature 18 and the upper end of said rod or bolt 24 (which projects beyond the arm 20) is threaded, as at 26, to receive a thumb nut 27 which is normally prevented from turning by means of a spring dog 28 secured to the arm 20 and engaging any one of a series of notches 29 in said thumb-nut. A spring 30 encircles the rod or bolt 24 within the pocketed enlargement 23, one end of said spring being seated against a shoulder 31 in said pocketed enlargement and the other end bearing against a disk or washer 32 on the rod or bolt 24. From this construction it will be seen that the armature of the magnet has a yielding connection with the arm 20 and that the tension of the spring 30 which affords such yielding connection can be readily adjusted by means of the thumb-nut 27.

A cam lever 33 is secured to the shaft 17, the arm 34 of said lever being bifurcated and resting on lugs 35 on the shoe lever 6 at respective sides of the connection of the rod 11 to the latter. The arm 36 of the cam lever 33 projects outwardly and terminates under the free end of the arm 9 of the shoe lever 5. The arm 9 is provided with a tubular boss 37 through which a threaded pin 38 passes. The lower end of this pin is provided with a head 39 to be engaged by the arm 36 of the cam lever and adjustment between said arm 36 of the cam lever and the free end of the shoe lever 5, can be readily effected by means of the screw 38 and this screw can be secured at any desired adjustment by means of a pin 40 passing transversely therethrough and engaging in any of a series of notches 41 in the upper end of the tubular boss 37.

The coil 15ª of the electro-magnet may be included, in any suitable manner, in circuit with the motor and for the accommodation of the leading in wires of said coil grooves, or notches 42, 43, (Fig. 6) are provided.

From the construction and arrangement of parts above described, it will be seen that when the circuit of the motor and of the coil of the brake magnet is open, the brake shoes will be applied to the brake wheel by the action of the spring 13. When the circuit is closed the brake magnet will attract its armature and thus transmit motion to the shaft 17. The turning of the shaft 17 will actuate the cam lever 33 and by the coöperation of the arms of the latter with the free ends of the respective shoe levers, the shoes will be moved against the resistance of the spring 13 to release the brake wheel and hence the armature of the motor. Thus when the motor is running and the circuit is opened, the brake magnet will become deenergized and the brake shoes will be applied at once by the action of the spring 13. As soon as the circuit is closed to start the motor the brake magnet will actuate its armature and the brake shoes will be released from the brake wheel in the manner above explained.

Various slight changes might be made in the details of construction of my invention without departing from the spirit thereof or limiting its scope, and hence I do not wish to restrict myself to the precise constructive details herein set forth.

Having fully described my invention what I claim as new and desire to secure by Letters-Patent, is,—

1. The combination with an electric motor frame and motor shaft, and a brake wheel on the motor shaft, of an electro-magnet on the field magnet frame of the motor, brake shoes embracing the brake wheel, a shaft on the motor frame, an armature for said electro-magnet having hinged connection with said shaft, an arm secured to said shaft and connected with the hinged armature, connections between said shaft and the brake shoes for releasing the latter from the brake wheel, and a spring for applying the brake shoes to the brake wheel.

2. The combination with an electric motor frame and motor shaft, and a brake wheel on the motor shaft, of a single magnet having its core integral with the outer face of the field magnet frame of the motor and having a winding on said core, brake shoes pivotally supported at one end and embracing the brake wheel, a hinged armature for the magnet, connections between the hinged armature and both of the brake shoes for releasing the latter from the brake wheel, and a spring for applying the brake shoes.

3. The combination with an electric motor frame and motor shaft, and a brake wheel secured to the shaft thereof, of shoe levers pivotally supported by the motor frame, a spring operating to apply the shoes carried by said levers to the brake wheel, a shaft mounted on the motor frame, a cam lever secured to said shaft and coöperating with the free ends of the respective shoe levers, an electro-magnet on the field magnet frame of the motor, an armature for said magnet hinged to said shaft, and an arm connecting said armature with the shaft carrying the cam lever, whereby the movement of the armature in one direction will actuate the cam levers to move the shoe levers in a direction to release the brake wheel.

4. The combination with a motor frame and motor shaft, and a brake wheel on the shaft thereof, of a magnet on the frame of said motor, a shaft mounted on the motor frame, an arm secured to the shaft, an armature for the magnet connected loosely with said arm, a yielding connection between said arm and the armature of said magnet, brake shoes embracing the brake wheel, and a cam lever secured to said shaft and coöperating with the brake shoes.

5. In a brake, the combination with a brake wheel, shoe levers, a shaft and a cam lever secured to said shaft and coöperating with the shoe levers, of a magnet, an armature for said magnet, an arm secured to said shaft, a yielding connection between said arm and the armature of said magnet, and means for adjusting said yielding connection.

6. In a brake, the combination with a brake wheel, shoe levers, a shaft, a cam lever secured to the shaft and coöperating with the shoe levers, a magnet, and an armature for said magnet, of an arm secured to the shaft and provided at its free end with a pocketed enlargement, a rod passing through said pocketed enlargement and pivotally attached at one end to the armature of the magnet, a spring interposed between said pocketed enlargement and said rod, and a thumb nut on said rod for adjusting the tension of said spring and the relation of the arm to the armature of the magnet.

7. In a brake, the combination with a brake wheel, shoe levers and a cam lever coöperating with the shoe levers, of a magnet, a pivoted armature for said magnet, an arm connected with the cam lever and projecting over the armature of the magnet, a rod passing through said arm and connected with said armature, a spring interposed between the arm and rod, a thumb-nut on the projecting end of said rod and means for holding said nut at any desired adjustment.

8. In a brake, the combination with a brake wheel, a shaft and a cam lever secured to said shaft, of shoe levers embracing the brake wheel, the free end of one of said shoe levers disconnected from but disposed in position to be engaged by one arm of the cam lever, an arm projecting from the other shoe lever and terminating over the other arm of the cam lever and disconnected therefrom, a headed pin adjustable in the free end of the arm on the shoe lever and adapted to be engaged by the adjacent arm of the cam lever, and means for securing said pin in any desired adjustment.

In testimony whereof, I have signed this specification in the presence of two subscribing witnesses.

CLARENCE L. TAYLOR.

Witnesses:
 FRED E. FANNER.
 D W. PELL.